(No Model.)  3 Sheets—Sheet 1.
W. A. DODGE.
SEED PLANTER.
No. 360,765.  Patented Apr. 5, 1887.
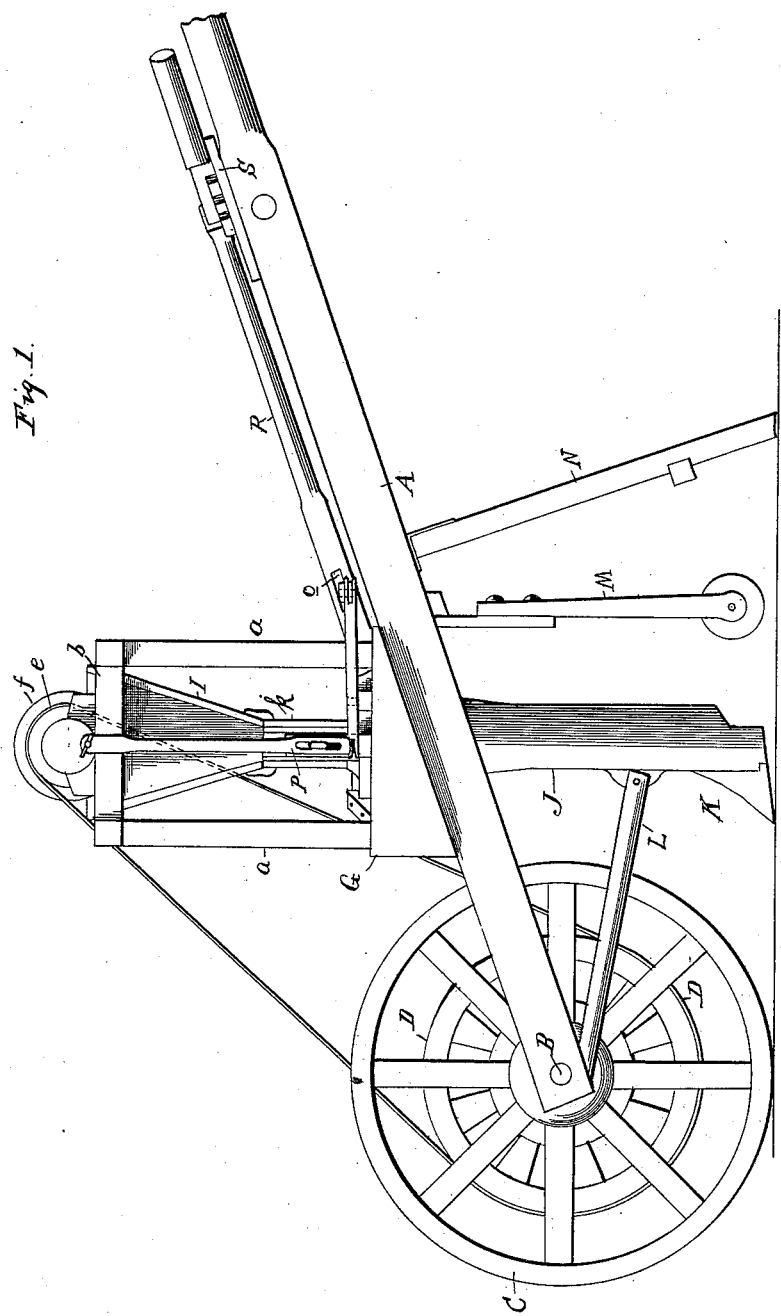
Witnesses
C. F. Raeder
Thos. E. Robertson
Inventor
Willard A. Dodge
By his Attorney
T. J. W. Robertson (No Model.)  W. A. DODGE.  3 Sheets—Sheet 2.
SEED PLANTER.
No. 360,765.  Patented Apr. 5, 1887.
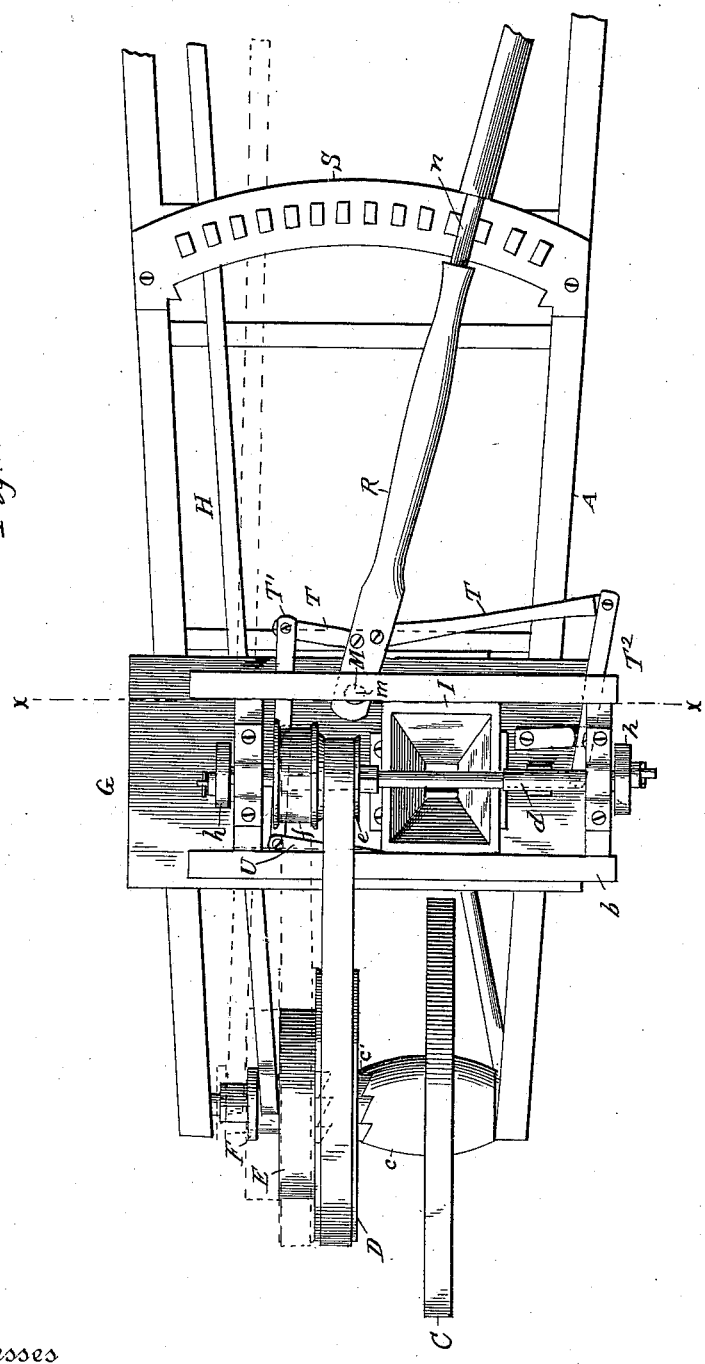
Witnesses  Inventor
  Willard A Dodge
  By his Attorney
  T. J. W. Robertson (No Model.)
3 Sheets—Sheet 3.
W. A. DODGE.
SEED PLANTER.
No. 360,765. Patented Apr. 5, 1887.
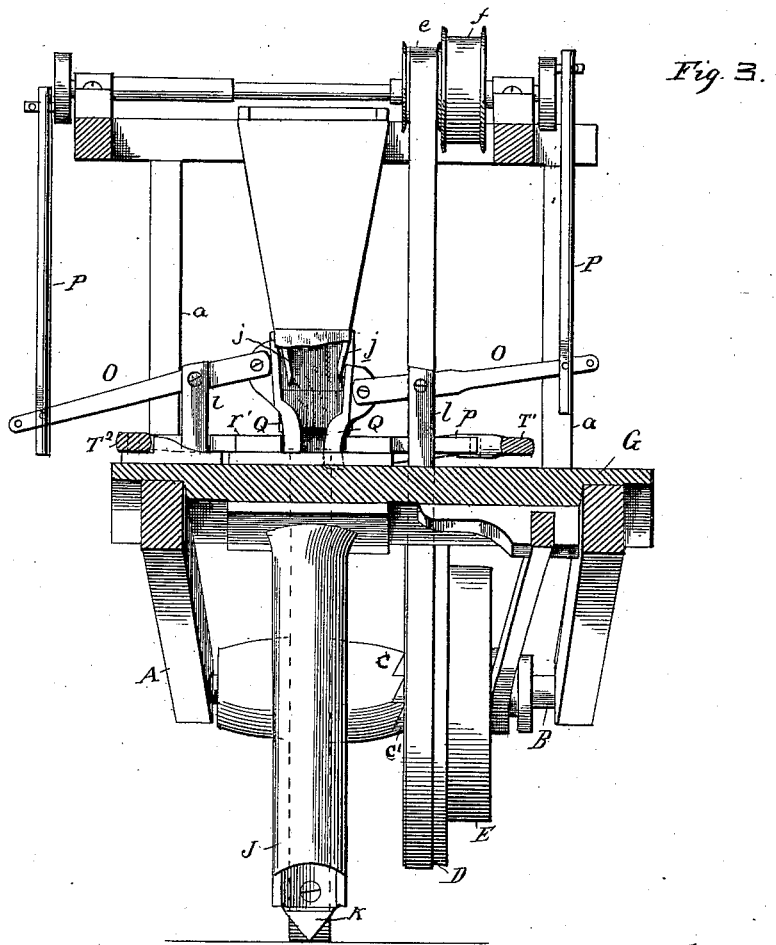
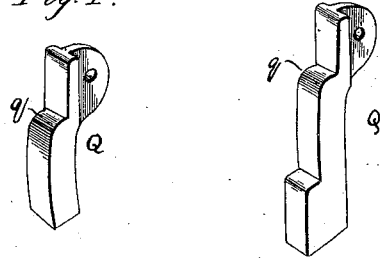
Witnesses
C. H. Raeder.
Thos. E. Robertson
Inventor
Willard A. Dodge
By his Attorney
T. W. Robertson

UNITED STATES PATENT OFFICE.

WILLARD A. DODGE, OF ALLEGANY COUNTY, NEW YORK.

SEED-PLANTER.

SPECIFICATION forming part of Letters Patent No. 360,765, dated April 5, 1887.

Application filed December 27, 1886. Serial No. 222,599. (No model.)

*To all whom it may concern:*

Be it known that I, WILLARD A. DODGE, a citizen of the United States, residing in the county of Allegany and State of New York, (P. O. address Scio,) have invented certain new and useful Improvements in Seed-Planters, of which the following is a specification, reference being had therein to the accompanying drawings, in which—

Figure 1 is a side elevation of a planter embodying my improvements. Fig. 2 is a top plan of the same. Fig. 3 is a transverse section of the same on the line X X of Fig. 2. Fig. 4 is a detail. Fig. 5 is a detail of a modification.

This invention relates to seeders, and has for its object to simplify and cheapen this class of devices, to provide for the uniform dropping of the seed without injury to the same, and also to provide for the adjustment of the feeding-fingers, so that the feed may be varied at will, as it is desired to feed faster or slower.

To these ends, and to such others as the invention may pertain, the same consists in the peculiar combinations and the novel construction, arrangement, and adaptation of parts, all as more fully hereinafter described, and then particularly pointed out in the claims.

Referring by letter to the said drawings, A designates a suitable frame, provided with suitable handles, as shown, and having journaled at the forward end thereof the shaft B, near one end of which is secured the wheel C, provided upon the inner side of its hub with one half, $c$, of a clutch.

D is a band-wheel loose on the shaft B, and carrying upon its inner face the other half, $c'$, of the clutch, which clutch may be of any approved form.

E is a band-wheel of smaller diameter than the wheel D, and formed integral therewith or rigidly secured thereto, as may be desired. This wheel is therefore loose on the shaft B.

F is a collar on the hub of the wheels D E, with an annular recess between said collar and the wheel E.

G is a platform or board secured to the longitudinal bars of the frame A to the rear of the wheels D E, and fulcrumed in any suitable way on the under side of this platform is the lever H, the forward forked end of which embraces the hub of the wheels D E in the recess between the collar F and the wheel E. The free end of this lever extends rearward within convenient reach of the operator, and by moving the same to the right or left the two parts $c\ c'$ of the clutch may be brought into contact or separated, as desired, for a purpose hereinafter described.

Standards $a$ arise from the platform G, and on these standards is secured the frame $b$, journaled in suitable bearings on which is the shaft $d$, parallel with the shaft B. Secured to this shaft are the band-wheels $e\ f$, in line with the wheels D E, respectively. The wheels $e\ f$ are of different diameters, so that by changing the belt $g$ from one to the other the speed of the shaft $d$ may be changed, as will be readily understood, this being an old and well-known expedient. At each end of the shaft $d$, I secure a disk, $h$, each of which is provided with a wrist-pin, $i$, the two pins being set upon opposite sides of the center of the disks, as clearly shown in Fig. 3.

I is the hopper secured to the frame $b$, and J is the boot secured to the under side of the platform G, and provided with the shovel K, both of ordinary construction.

L is a brace-rod attached at one end to the boot in any suitable way, in the present instance being shown secured to a lug on said boot, and at its other end to one of the longitudinal bars of the frame A. M is a coverer, secured in any suitable manner to the frame in rear of the boot, and N is a support hinged to said frame in rear of the coverer and designed to support the planter when in an upright position.

Secured to the bottom of the hopper are the guide-strips $j$, which serve to guide the grain between the feed-fingers, which are soon to be described. The hopper is provided with an extension, $k$, one or more sides of which are made detachable, in order that the parts within the same may be readily gotten at when necessary.

Short standards $l$ are secured to the platform G upon opposite sides of the hopper, and are provided, preferably, with forked ends, in which are pivoted the levers O, the outer ends of which are connected to the wrist-pins $i$ on the disks $h$ by the rods P. The inner ends of these levers are pivotally secured in any suitable way to the feeding-fingers Q, the upper ends of which are guided by the blocks j, while their lower ends are slightly curved, as shown in Fig. 4. These fingers work through slots in the sides of the extension to the hopper.

In the forward movement of the planter, the clutch being in engagement, motion is imparted to the shaft d through the mechanism described, and motion from the shaft d is transmitted to the fingers Q by means of the levers O, rods P, and disks h and wrist-pins i, and, owing to the arrangement of these parts, the said fingers are reciprocated in opposite directions in a vertical plane. The action of the said fingers upon each other is analogous to the movement of the thumb and index-finger when rubbed against each other, the seed in the hopper being allowed to drop through between the fingers by one finger moving past the other. The lower seed held between the fingers, having no support, on the continued reciprocation of the fingers, falls to the ground of its own gravity. It has been found that this manner of feeding the seed not only insures a uniform feed, but it prevents injury to the seed.

In order to suit different-sized seeds and to feed faster or slower, as may be desired, I have provided the following mechanism: R is a hand-lever pivoted to the platform G at m, and at its other end provided with suitable handle, and provided also with a squared portion, n, designed to fit between the teeth in the notched quadrant S, secured to the top of the frame A. Near its pivoted end this lever is provided with a horizontal slot, o, in which are pivoted one end of the links T and the levers T' T², the latter of which is fulcrumed in any suitable way on the top of the platform, and at its other end has pivotally secured to it a rod, p', which slides through a slot in the standard l and bears against one of the fingers Q. The lever T' is pivotally secured at its forward end to the piece U, attached to the platform, and carries a rod, p, which slides through a slot in the standard l, and bears against the finger Q on that side of the planter. By adjusting the lever R in the proper direction the rods p p' are simultaneously moved toward each other, and, bearing against the fingers Q, cause the latter to approach each other, thus diminishing the space between them, and consequently the amount of seed to be fed thereby. Moving the lever R in the opposite direction enlarges the space between the fingers, and consequently increases the feed.

The fingers Q are formed each with an offset or shoulder, q, which is preferably rounded, as shown in Figs. 3 and 4. These shoulders form a support for the seed and prevent its clogging, and by being rounded they allow the seed to readily fall down between the fingers without being crushed or otherwise damaged. I sometimes form them with a second shoulder. (See Fig. 5.)

Having thus described my invention in its preferable form, without limiting myself to the precise construction shown, what I claim as new is—

1. The combination, with the vertically-reciprocating feeding-fingers, of means for regulating the space between said fingers, substantially as and for the purpose specified.

2. The combination, with the hopper and vertical extension thereof, of two feeding-fingers working in said extension, and the guide-strips within said hopper serving to direct the seed between the upper ends of said fingers, substantially as described.

3. The combination, with the hopper, of the feeding-fingers provided each with an offset, as q, and means for operating said fingers, substantially as described.

4. In a seeder, a feeding-finger provided with a rounded offset, substantially as and for the purpose specified.

5. In a seeder, a feeding-finger curved as shown and provided with a rounded offset, substantially as and for the purpose specified.

6. The combination, with the feeding-fingers and the lever R, of the rods p p', bearing against said fingers, and connections between said rods and lever, substantially as described.

7. The combination, with feeding-fingers and the lever R, of the rods p p', levers T' T², pivotally connected with said rods, and the links T T, connecting said levers T' T² with the lever R, substantially as and for the purpose specified.

8. The combination, with the feeding-fingers, the shaft B, and wheel C, of the shaft d, deriving motion from said wheel, and connections between said shaft d and feeding-fingers, whereby the latter are moved in opposite directions simultaneously, substantially as described.

In testimony whereof I affix my signature, in presence of two witnesses, this 24th day of December, 1886.

WILLARD A. DODGE.

Witnesses:
LOUIS A. BLACK,
A. E. ACKLEY.